United States Patent Office 3,299,605
Patented Jan. 24, 1967

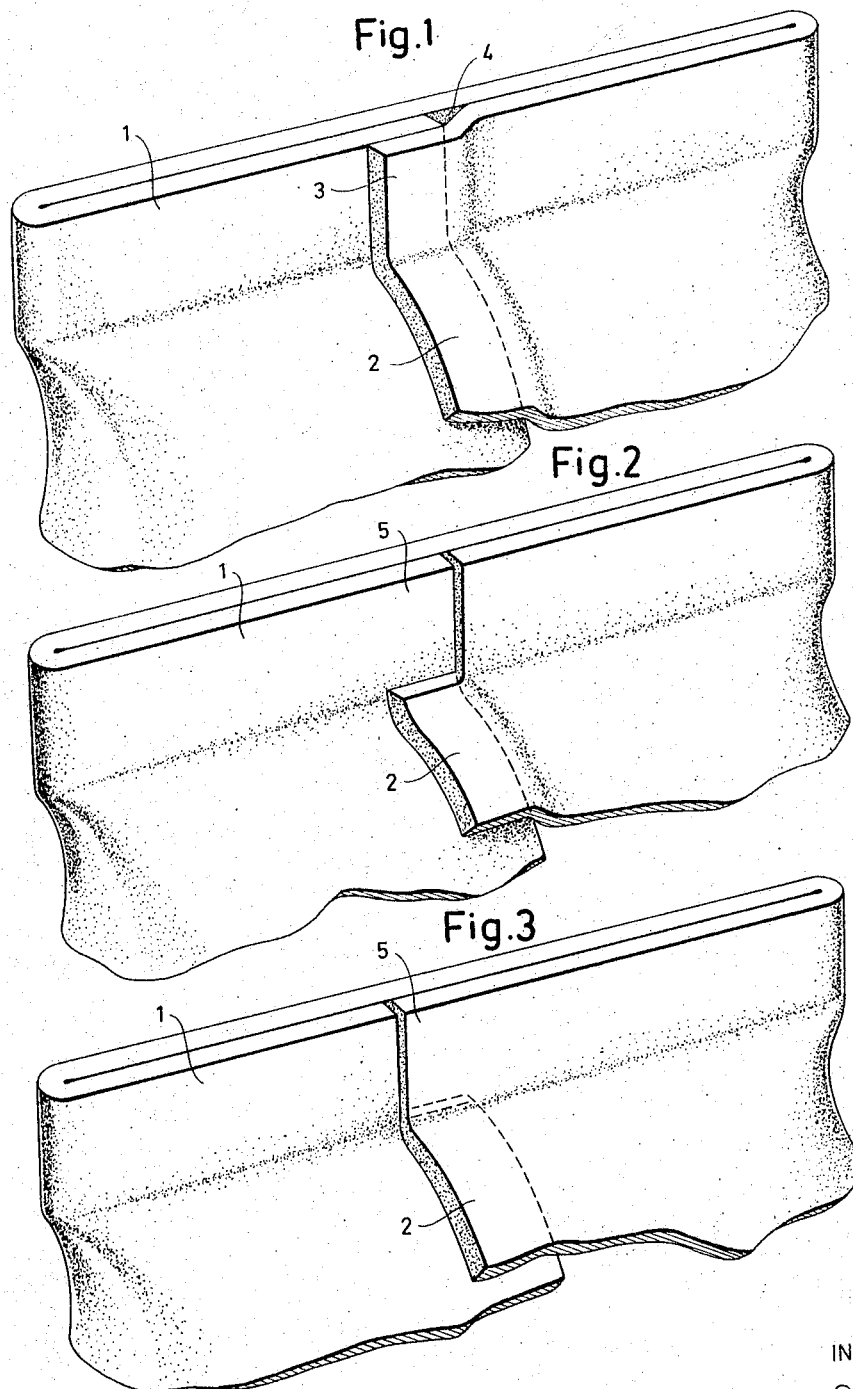

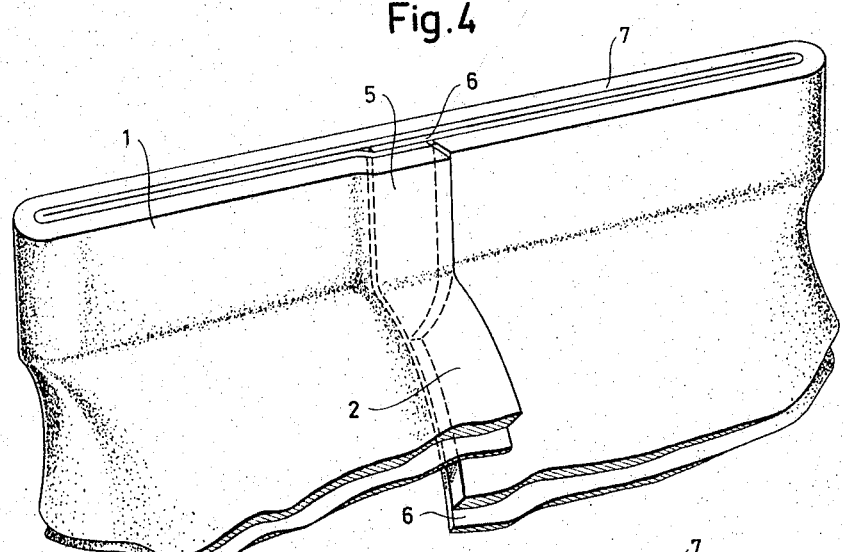
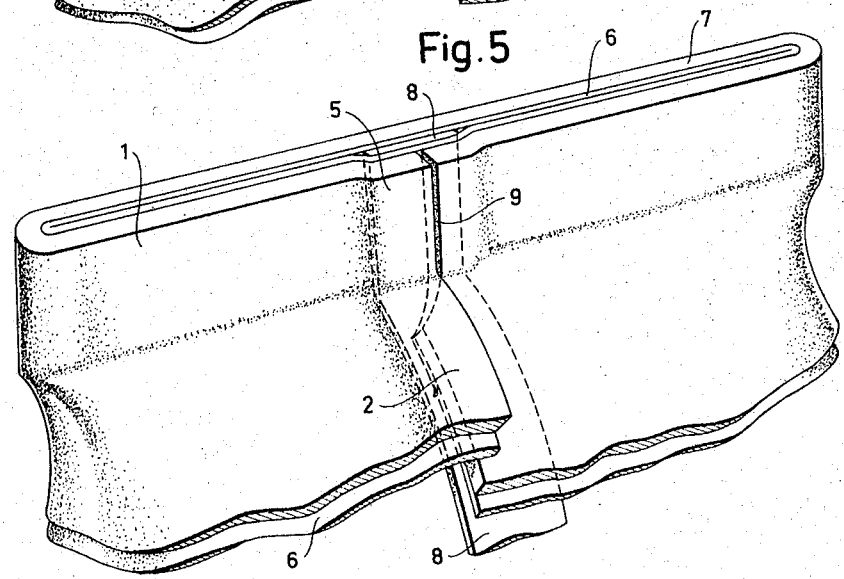

3,299,605
METHOD OF MAKING PACKAGES FROM
A WEB OF MATERIAL
Harald Georg Swede, Malmo, Sweden, assignor to AB
Tetra Pak, Lund, Sweden, a company
Filed Feb. 13, 1964, Ser. No. 344,589
Claims priority, application Sweden, Feb. 14, 1963,
1,601/63
2 Claims. (Cl. 53—28)

The present invention relates to a method of making packages from a web of material by shaping the web into a tube provided with a longitudinal overlapping joint, said tube having filling material fed to it and being sealed off by transverse seals along narrow zones spaced from each other and generally located opposite to the tube axis, and being thereafter separated off so as to form individual packaging units by means of cuts in the said sealing zones.

The above mentioned method of making and filling packages is both practical and economical, since the packaging material does not have to be prepared in advance, e.g., by punching so as to form packaging blanks or the like. The method has come into wide use in later years, above all perhaps because of the modern thermoplastic materials which are suitable as packaging material, e.g., for foodstuffs because of their density and resistance to a great many fats, liquids and gases. These thermoplastic materials may easily be heat-sealed on account of their thermoplasticity so as to form leakproof and durable sealing joints.

A drawback of the method described is, however, that at the transverse sealing joints there will accumulate a quantity of material which affects the sealing properties in an undesirable manner at the point where the transverse joint and the longitudinal joint overlap. The reason for this accumulation of material is, of course, that the longitudinal joint is generally an overlapping joint, whereby the material at the longitudinal joint sealing zone is made double. The result is consequently that the transverse sealing joint does not acquire an even thickness but is 50 percent thicker where the longitudinal joint and the transverse joint overlap than in surrounding areas. As the strength and impermeability of the transverse seal are dependent on both heat and pressure, it is evident that a pressure which is unevenly distributed over the transverse joint area has a detrimental effect on the strength and leak-proof properties of the seal, and at the same time it is easily realized that it is very difficult to distribute the pressure evenly over the whole transverse sealing area when the thickness of the material varies abruptly by up to 50 percent.

These drawbacks may, however, easily be avoided or at least be caused to make themselves less felt with the aid of a method according to the invention, which is characterized in that the web of packaging material is reduced in thickness, at least partly, along one of the overlapping margins in the longitudinal joint in those areas where the longitudinal joint overlapping zone and the transverse sealing zone overlap.

Further characteristics of the invention are that where it is provided with a plastic layer facing inwardly in the tube shaped from the web, the web is devised in such a way that along its inner web margin in the overlap it is provided with a plastic strip projecting outside the web margin, said plastic strip constituting, with regard to its effect, an extension of the said plastic layer, and that the said plastic strip is caused to adhere in the longitudinal joint to the said plastic layer in the outer web margin in the longitudinal joint overlap. In order that the thinned portions produced in the longitudinal joint may have the intended effect it is, of course, necessary to locate them at the points on the web which in the finished package are corresponded to by the overlap of the longitudinal joint overlapping zone with the transverse sealing zone.

Through the invention the transverse sealing zone obtains an almost even thickness, and consequently the sealing result obtains an even and high quality along the whole transverse sealing zone.

The invention will be described in the following with reference to the appended diagrammatic drawing, in which FIG. 1 shows a transverse sealing joint in a flattened tube provided with a longitudinal overlapping joint;

FIG. 2 shows a transverse sealing joint in a flattened tube provided with a longitudinal overlapping joint having a notch in the outer web margin in the overlap in the areas where the longitudinal and transverse joints overlap;

FIG. 3 shows a transverse sealing joint in a flattened tube provided with a longitudinal overlapping joint having a notch in the inner web margin in the overlap in the areas where the longitudinal and the transverse joints overlap;

FIG. 4 shows a transverse sealing joint in a flattened tube of a composite material provided with a longitudinal overlapping joint, in which the layer facing the inside of the tube consists of plastic and where the inner web margin in the overlap has been treated in such way that the inner plastic layer is still intact; and FIG. 5 shows the transverse sealing joint of a composite material where the layer facing the inside of the tube consists of plastic and where a plastic strip has been disposed so that at least in the transverse sealing zones it overlaps the abutting edges of the longitudinal joint.

The transverse sealing joint shown in FIG. 1, which is not constructed in accordance with the invention, has a thickened portion 3 where the longitudinal joint 2 and the transverse seal 1 overlap. In addition to the drawbacks created by the fact that the pressure is not evenly distributed, at the sealing operation, over the whole transverse sealing zone, and that the strength of the seal therefore becomes inferior in the area adjacent the portion 3, there is also easily formed a passage 4 which connects the interior of the package with the surrounding atmosphere and will consequently easily cause leakage.

An example of transverse joints made in accordance with the invention is shown in FIGS. 2 to 5, where FIGS. 2 and 3 show transverse joints having recesses 5 disposed in the longitudinal joint in respectively the outer and inner web margins in the longitudinal joint overlap 2 in the areas where the longitudinal joint overlap 2 and the transverse joint 1 overlap each other.

In the cases where the packaging material consists of an interior plastic layer on a carrying layer of e.g. paper or cardboard, it may prove more advantageous to remove the carrying layer only and let the plastic layer remain intact. Such a transverse sealing joint is shown in FIG. 4, where the carrying material 7 has been removed at the web margin in the longitudinal joint overlap within the area designated 5 and located in the overlap between the transverse sealing zone 1 and the longitudinal joint sealing zone 2. The plastic layer 6 beneath the carrying material 7 removed at the portion 5 is kept intact, whereby a joint having very good sealing properties is obtained, since the longitudinal joint seal is intact also in the areas overlapping the transverse sealing joint, while on the other hand the thickness of the transverse sealing joint is increased only insignificantly in the mentioned areas, since the plastic layer 6 is generally thinner than the carrying layer 7.

FIG. 5 shows a variation of the joint shown in FIG. 4. It is true that both the carrying layer 7 and the plastic layer 6 have been removed from the web margin in the longitudinal joint 2 within the area 5, but a strip 8 of plastic material is disposed so as to overlap both the inside of the longitudinal joint and the edges 9 abutting against each other in the transverse sealing area 1. In this case, too, the transverse sealing joint becomes somewhat thicker on account of the thickness of the plastic strip 8 but since this increase of thickness is insignificant, it hardly affects the sealing properties of the joint.

By making the transverse sealing joints in accordance with the invention, very good sealing properties are consequently obtained, and of course this is of the greatest importance for packages which are meant to contain liquids.

Of course, it is not necessary to remove the web margin material altogether within the areas 5 where the transverse sealing joint 1 and the longitudinal joint 2 overlap, but considerable advantages are achieved by reducing the thickness of the web margin by machining or punching the web material within the said areas.

The machining or punching of the web margin in the areas which correspond, in the finished package, to the places where the longitudinal joint overlapping zone and the transverse sealing zone overlap may be carried out with a special tool mounted in the machine converting the web into a tube, pressing the tube flat and sealing it so as to form individual packages. In this case it is relatively easy to adjust the position of the punching tool to the web so that the punched portion 5 will be located where intended in the finished package.

Of course, it is also possible to provide the web of material in advance with the requisite punched or thinned-out portions of the web margins, it being possible to adapt the treated areas in the web margin to actuate sensing means disposed at the packaging machine. These sensing means may in turn be caused to guide the paper web in a manner known in art of control means so that the treated areas of the web margin will be located at the places where the longitudinal joint overlapping zone and the transverse sealing zone overlap.

What is claimed is:

1. A method of making packages from a web of material comprising both reducing the thickness of the web material at longitudinally spaced areas along one margin of the web and shaping the web into a tube having a longitudinal overlapping joint, transversely sealing said tube along narrow zones through said longitudinally spaced areas of reduced thickness, and transversely cutting said tube through said narrow transversely sealed zones to form individual package units.

2. A method as claimed in claim 1, wherein the web material is completely removed at said longitudinally spaced areas.

References Cited by the Examiner

UNITED STATES PATENTS

| | | | |
|---|---|---|---|
| RE 21,971 | 12/1941 | Bergstein. | |
| 1,983,291 | 12/1934 | Haskell | 53—28 X |
| 2,169,936 | 8/1939 | Wagner. | |
| 2,239,133 | 4/1941 | Waters. | |
| 2,307,890 | 1/1943 | Lakso | 53—28 X |

GRANVILLE Y. CUSTER, Jr., *Primary Examiner.*